UNITED STATES PATENT OFFICE.

CARLOS B. COCHRAN, OF WEST CHESTER, PENNSYLVANIA.

METHOD OF TESTING MILK.

SPECIFICATION forming part of Letters Patent No. 418,448, dated December 31, 1889.

Application filed July 3, 1889. Serial No. 316,438. (No specimens.)

*To all whom it may concern:*

Be it known that I, CARLOS B. COCHRAN, a citizen of the United States, residing at West Chester, in the county of Chester and State of Pennsylvania, have invented a new and useful Improvement in the Method of Testing Milk, which improvement is fully set forth in the following specification.

My invention consists of a novel method of testing milk, the nature and advantages of the same being hereinafter set forth; and in carrying out the same I take a flask or vessel having a graduated tube and place therein the milk to be tested—say ten cubic centimeters—adding thereto, say, five cubic centimeters of glacial acetic acid and five cubic centimeters of sulphuric acid. Stand the flask in boiling water, so that the contents are boiled for, say, ten or fifteen minutes, the flask being shaken near the end of the boiling process. The flask is then removed from the boiling water and allowed to cool, after which there is introduced into the same, say, seven cubic centimeters of ether or other volatile solvent, and the flask is well shaken, so as to thoroughly mix the ether with the contents of the flask, the ether liberating the fat of the milk. The ether is afterward evaporated and hot water then poured into the flask, whereby the fat is raised, it entering the graduated tube, where its volume and per cent. may be ascertained. The hot water last employed serves to prevent the fat from adhering to the sides of the tube; otherwise the test may be unsatisfactory.

It will be seen that there is a complete separation of the fat from the milk, and the fat is free from every trace of caseine, and will be found to be a clear oily layer floating on the liquid in the flask, which readily rises in the graduated tube when the hot water is introduced into the flask, and may be accurately read off.

Having thus described my invention, what I claim as new, and desire to secure by Letters Patent, is—

1. The method or process herein described of testing milk, consisting, first, in mixing in a suitable receptacle a quantity of the milk with acids, then placing for a short time the receptacle, with its contents, into boiling water and agitating the same while therein, then removing the receptacle and cooling the contents thereof, then introducing a volatile solvent into said receptacle, and, after agitating the mass, evaporating the solvent, and, lastly, adding hot water to the mass thus treated, substantially as described.

2. The method or process herein described of testing milk, consisting, first, in placing a quantity of milk in a flask or other suitable receptacle and mixing acids, as described, with the same, then agitating and boiling the milk, then cooling it and introducing a volatile solvent in the same, after which evaporating the ether and adding hot water to the prepared mass, substantially as described.

CARLOS B. COCHRAN.

Witnesses:
   JOHN A. WIEDERSHEIM,
   A. P. JENNINGS.